Feb. 2, 1926.
W. G. PRICE
CURRENT METER
Filed Nov. 21, 1922
1,571,433
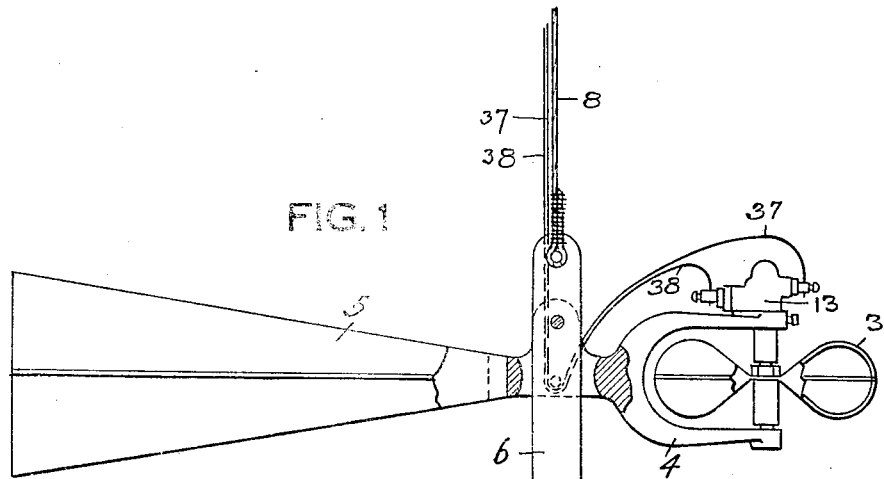
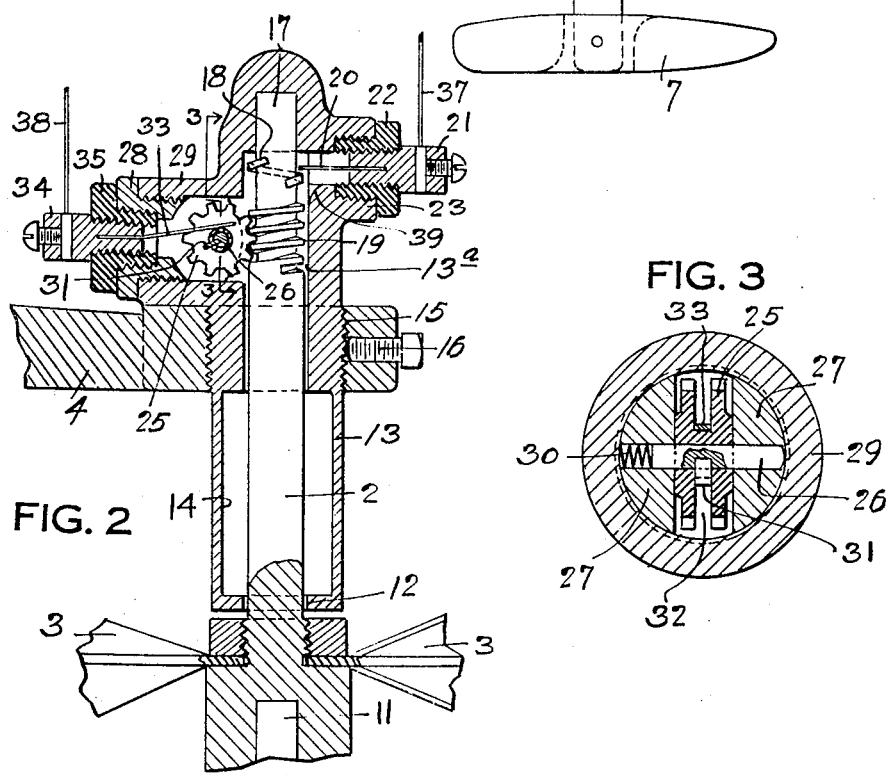
INVENTOR
William G. Price
By Kay, Totten & Brown,
Attorneys Patented Feb. 2, 1926.

1,571,433

UNITED STATES PATENT OFFICE.

WILLIAM G. PRICE, OF YAKIMA, WASHINGTON, ASSIGNOR TO W. & L. E. GURLEY, OF TROY, NEW YORK, A CORPORATION OF NEW YORK.

CURRENT METER.

Application filed November 21, 1922. Serial No. 602,446.

*To all whom it may concern:*

Be it known that I, WILLIAM G. PRICE, a citizen of the United States, and resident of Yakima, in the county of Yakima and State of Washington, have invented a new and useful Improvement in Current Meters; and I do hereby declare the following to be a full, clear, and exact description thereof.

My invention relates to current meters for use in measuring the flow of streams and for similar purposes, and its general object is to improve the construction shown in Letters Patent of the United States No. 1,413,355 granted to me April 18, 1922.

The current meter shown in my prior patent mentioned above includes a rotating spindle supported in upper and lower bearings of the inverted-cup type, these bearings being enclosed within sleeves or tubes so arranged that when the instrument is immersed in water the water cannot penetrate to the bearing surfaces. An electric contact member is arranged adjacent to the rotating spindle in such a way as to make and break the electric circuit through the contact member once during each revolution of the spindle.

My present invention aims to improve the construction of this meter by enclosing the spindle and the contact device in the smallest possible space having the least amount of air to be compressed by water rising in the inverted cup, so that the meter can be immersed to a considerable depth before the water, with the grit which it usually contains, can rise up to the contact breakers.

Another specific object of my invention is to so arrange the contact device that the spindle may be inserted into its bearing and removed therefrom without breaking or distorting the contact members, and without having to adjust them after the spindle is in place.

A further object of my invention is to provide the current meter with two separate electric contact devices, one of which breaks contact once for each revolution of the spindle and is to be used in water currents of slow velocities, while the other contact breaker breaks contact every fifth, tenth or other desired periodical revolution of the spindle and is used in swift currents where the revolutions of the wheel are so rapid that it is difficult to mentally count the individual revolutions. A still further object of my invention is to simplify the device and reduce the cost of manufacture.

In the accompanying drawing Fig. 1 is a side view of an instrument constructed in accordance with my invention; Fig. 2 is a vertical sectional view taken axially through the spindle and the make-and-break devices; and Fig. 3 is an enlarged vertical section taken substantially on the line 3—3, Fig. 2.

The general construction of the instrument shown in the drawing is similar to that shown and described in my above-mentioned Patent, No. 1,413,355. It comprises a vertical spindle 2 carrying a set of cups 3 and supported in bearings in a forked support 4 that also carries a set of vanes 5. The support 4 is pivotally secured to a hanger 6, to the lower end of which is attached a cigar-shaped weight 7, while the upper end of the hanger is suspended from the rope or other suspension means 8. The lower end of the spindle 2 is provided with a tubular opening, the upper end of which provides a bearing seat for the upper end of a bearing pin 11.

The portion of the spindle 2 above the cups 3 extends into an opening 12 formed at the lower end of a bearing member 13. The opening 12 is slightly larger than the diameter of the spindle 2 and communicates with a much larger recess 14 which is made as large as the design of the instrument will permit in order to enclose a considerable volume of air. The bearing member 13 is screw-threaded on its outer surface, as shown at 15, and is received in a screw-threaded opening in the upper arm of the forked support 4, the position of the bearing member being fixed by means of a set screw 16. Above the opening 14 in the bearing member 13 is a bore 13ª of reduced diameter, above which is a bearing recess of still less diameter which is preferably cylindrical and is shaped to form a bearing for the upper end 17 of the spindle 2.

The spindle 2, as best shown on Fig. 2, is provided with two worms 18 and 19. These worms are preferably cut in the spindle, and are of no larger diameter than the main body of the spindle, in order that the air space above the opening 14 may be as small as possible.

The upper worm 18 is not continuous, a part of this worm being omitted, as shown on Fig. 2. This worm cooperates with a spring contact finger 20 which normally projects horizontally from a binding post 21 screwed into an insulated bushing 22 which is itself screwed into an internally screw-threaded coupling 23 that extends laterally from the bearing member 13 near its upper end.

When the spindle 2 is revolved in a right-hand direction, the spring contact member 20 slides on the under side of the worm 18 until it escapes from the worm and thus breaks contact. When the shaft is revolved in the opposite direction the spring 20 slides on the upper side of the worm 18 until it escapes from the worm.

The large worm 19 drives a worm gear wheel 25 which may suitably be composed of fiber or other insulating material, and which has ten teeth, so that the gear wheel 25, and the shaft 26 on which this gear wheel is mounted, make one revolution for every 10 revolutions of the spindle 2. The number of teeth in the gear wheel 25 may be varied, if desired, and in some cases it will be useful to provide a gear having five teeth instead of 10. The shaft 26 is mounted in bearings formed in two arms 27 carried by a screw-threaded bushing 28 which is screwed into an internally screw-threaded coupling 29 communicating with the internal bore of the bearing member 13. A metal coil spring 30 rests against one end of the shaft 26, and against the bearing member 13 as shown on Fig. 3, and the shaft 26 carries a metal lug 31.

The gear wheel 25 has a deep central annular groove 32, and the lug 31 projects through the bottom of this groove. A resilient spring contact member 33 is carried by a binding post 34 which is screwed into an insulating bushing 35 screwed into the bushing 28 which supports the gear wheel 25. Near its outer end the spring contact member 33 rests upon the bottom of the groove 32 in the gear wheel 25, in which position it is engaged by the lug 31 once during each complete revolution of the gear wheel 25.

The spring contact finger 33 is made straight, and when the parts are assembled the spring 33 is bent up, as shown on the drawing. This spring is made long enough so that the contact lug 31 cannot catch against the end of the spring 33 when the gear wheel 25 is revolved in a counter-clockwise direction.

The binding posts 21 and 34 are connected by means of suitable conducting wires 37 and 38, respectively, with any ordinary or desired form of indicating or counting mechanism, and with a suitable source of electric energy.

In the operation of the current meter described above, the instrument is immersed in the stream to be measured and the flowing current acts through the cups 3 to rotate the spindle 2. The revolutions are counted by means of the contact finger 20, and the small worm 18, if the flow of the current is sufficiently slow to enable single rotations of the spindle 2 to be conveniently counted. When the stream to be measured is so rapid as to make it difficult or impossible to count single rotations of the spindle, the small worm and contact member are disregarded and the count is made through the electric contact member 33 which is engaged by the contact lug 31 once for each 10 revolutions, or other multiple revolutions, of the spindle 2.

One advantage of the construction herein shown is that both contact spring 20 and 33 are made straight and do not require to be made of a certain exact curved form, as in prior types of current meters.

It is desirable to cut away the metal of the bearing member 13, as shown at 39, in order to enable the spring finger 20 to bend down sufficiently to release the worm 18. When the bearing member is constructed in this manner the spindle 2 can be removed and inserted without injury to the spring 20. Neither of the contact springs requires adjustment, which is necessary in prior current-meter designs.

I claim as my invention:

1. A current meter comprising a member adapted to be rotated in response to fluid flow, and an electric contact breaker having an insulated grooved gear wheel, a metal shaft carrying said gear wheel, a lug on said shaft projecting into the groove in said gear wheel, and a resilient electric contact member resting in said groove and contacting with said lug as said gear wheel revolves.

2. A current meter comprising an electric make-and-break device comprising an insulated gear wheel having an annular groove, a metal shaft carrying said gear wheel, a metal lug on said shaft projecting into said groove, and a resilient electric contact member resting in said groove and making and breaking electric contact with said lug as said gear wheel revolves.

3. In a current meter, the combination of a rotatable spindle, a discontinuous worm carried by said spindle, a second and longer worm also carried by said spindle, a bearing member surrounding said spindle, two binding posts carried by said bearing member and communicating with the interior thereof adjacent to the said worms, a resilient contact member carried by one of said binding posts and extending into the path of movement of said discontinuous worm, a second resilient contact member carried by the other binding post, an insulated grooved gear wheel driven by said longer worm, a metal shaft carrying said gear wheel, and a lug carried by said shaft, the said last-named contact member resting in the bottom of said grooves in said gear wheel, and said lug being adapted to make and break contact with said second contact member as said gear wheel revolves.

4. In a current meter, the combination of a casing, a rotatable spindle extending into said casing, a plurality of worms cut into said spindle and of no greater diameter than said spindle, and straight resilient electric contact members supported by said casing and actuated by said worms, said spindle being capable of being inserted into said casing and removed therefrom without injuring said contact members or requiring adjustment thereof.

In testimony whereof I, the said WILLIAM G. PRICE, have hereunto set my hand.

WILLIAM G. PRICE.